Patented Oct. 7, 1930

1,777,756

UNITED STATES PATENT OFFICE

RALPH N. LULEK, OF WILMINGTON, DELAWARE, ASSIGNOR TO E. I. DU PONT DE NEMOURS & COMPANY, OF WILMINGTON, DELAWARE, A CORPORATION OF DELAWARE

VAT COLOR OF THE 1:9 THIAZOLE-ANTHRONE SERIES

No Drawing.   Application filed March 18, 1927.   Serial No. 176,579.

This invention relates to the development of new yellow vat colors of the anthraquinone series. More particularly it relates to the process of, and the product resulting from condensing 1-mercapto-2-amino-anthraquinone with 1:9-thiazole-anthrone-2-carbonyl chloride or 1:9-thiazole-anthrone-2-aldehyde.

Vat colors have been obtained by condensing 1:5 dimercapto-2:6-diamino-anthraquinone with benzaldehyde, benzoyl chloride, anthraquinone-2-aldehyde, etc. In all these cases dithiazoles are obtained, since the mono-thiazoles (obtained by condensing 1-mercapto-2-amino-anthraquinone with benzoyl chloride or anthraquinone-2-aldehyde, respectively) are of no tinctorial value.

This invention has as an object the condensation of 1-mercapto-2-amino-anthraquinone with 1:9-thiazole-anthrone-2-carbonyl chloride (prepared by treating 1:9-thiazole-anthrone-2-carboxylic acid with thionyl chloride or phosphorous pentachloride) or 1:9-thiazole-anthrone-2-aldehyde, respectively, to yield a new vat color of greenish-yellow shade on cotton, being a 1:9-thiazole-anthrone-2:1′:2′-anthraquinone-thiazole, also known as 1:9-isothiazole-anthron-2:1′:2′-anthraquinone-thiazole.

I have discovered that if 1:9-thiazole-anthrone-2-carboxylic acid is treated with thionyl chloride or phosphorous pentachloride in an organic solvent, respectively, 1:9-thiazole-anthrone-2-carbonyl chloride is formed. This compound condenses with 1-mercapto-2-amino-anthraquinone in an organic solvent (especially nitro benzene) to the former mentioned 1:9-isothiazole-anthron-2:1′:2′-anthraquinone-thiazole, which is an exceptionally fast vat color of greenish-yellow shade. The same compound may be obtained by condensing 1:9-thiazole-anthrone-2-aldehyde with 1-mercapto-2-amino-anthraquinone in concentrated sulfuric acid. The compound must be regarded as entirely new as no vat colors of definite structure containing an isothiazole-anthron group have heretofore been known.

The following formulas most probably represent the reaction that takes place:

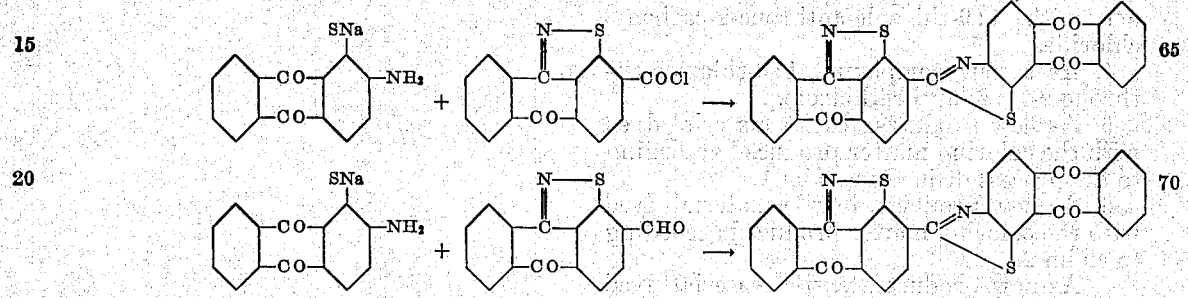

The process is disclosed in detail by the following examples. It is to be understood, however, that the reagents, proportions and conditions therein set forth are purely illustrative.

Ten parts of 1:9-thiazole-anthrone-2-carboxylic acid are heated to boiling with 50 parts thionyl chloride on the steam bath for twenty hours. The thionyl chloride is distilled off and the residue (1:9-thiazole-anthrone-2-carbonyl chloride) is suspended in 50 parts benzene and filtered, washed with benzene, and nitrobenzene. The wet cake is then heated with 9.2 parts of 1-mercapto-2-amino-anthraquinone in 250 parts nitrobenzene to 180° C. and kept at this temperature under agitation for ½ hour. The compound may be purified by running in chlorine at 150–170° C. for two hours.

The filtered and washed (nitrobenzene and alcohol) product shows a greenish-yellow color and appears under the microscope in very fine needles. It is insoluble in water, alkali, hot pyridine, and hot nitrobenzene; soluble in concentrated sulfuric acid with yellow color and gives with alkaline hydrosulphite a violet vat.

The new vat color dyes on cotton and artificial silk in greenish-yellow shades very fast to washing, chlorine, acid, alkali, and light.

As many apparently widely different embodiments of this invention may be made without departing from the spirit thereof, it is to be understood that I do not limit myself to the foregoing examples or description except as generally indicated in the claims.

I claim:

1. The process of producing a vat color of the anthraquinone series, which consists in condensing 1-mercapto-2-amino-anthraquinone with a 1:9-thiazole-anthrone containing, in the 2-position, a group —$C\begin{smallmatrix}\nearrow O\\\searrow R\end{smallmatrix}$, in which R represents a radical taken from a group including hydrogen and chlorine.

2. The process of producing a vat color of the anthraquinone series, which comprises condensing a 1-mercapto-2-amino-anthraquinone with 1:9-thiazole-anthrone-2-carbonyl halide.

3. The process of producing a vat color of the anthraquinone series which comprises condensing 1-mercapto-2-amino-anthraquinone with 1:9-thiazole-anthrone-2-carbonyl chloride.

4. As a new compound, 1:9-thiazole-anthrone-2-1':2'-anthrathiazole.

5. As new products, textile material dyed with the coloring matter produced according to the process defined in claim 1.

6. As new products, textile material dyed with the coloring matter produced according to claim 2.

7. As new products, textile material dyed with the coloring matter defined in claim 4.

8. The process of producing a vat color of the anthraquinone series which comprises condensing 1-mercapto-2-amino-anthraquinone with 1:9-thiazole-anthrone-2-aldehyde.

In testimony whereof I affix my signature.

RALPH N. LULEK.